United States Patent [19]
Gustavsson et al.

[11] 4,345,921
[45] Aug. 24, 1982

[54] SPRAY CHAMBER INCLUDING A WET SEPARATOR

[75] Inventors: Lennart Gustavsson; Osten Maatta, both of S-Vaxjo, Sweden

[73] Assignee: AB Svenska Flaktfabriken, Nacka, Sweden

[21] Appl. No.: 257,158

[22] Filed: Apr. 24, 1981

[30] Foreign Application Priority Data

Jul. 4, 1980 [SE] Sweden ............................ 8004943

[51] Int. Cl.³ .................... B01D 47/10; B05C 15/00
[52] U.S. Cl. .................................. 55/223; 55/241; 55/248; 55/276; 55/DIG. 46; 261/112; 261/DIG. 54; 98/115 SB; 118/DIG. 7
[58] Field of Search ............... 55/223, 240, 241, 248, 55/276, DIG. 46; 261/112, 118, DIG. 54; 98/115 SB; 118/326, DIG. 7

[56] References Cited

U.S. PATENT DOCUMENTS

| | | | |
|---|---|---|---|
| 3,138,441 | 6/1964 | Krantz | 261/DIG. 54 |
| 3,168,031 | 2/1965 | Wilhelmsson et al. | 55/DIG. 46 |
| 3,795,093 | 3/1974 | Gerhard et al. | 55/240 |
| 4,045,524 | 8/1977 | Bornert | 261/DIG. 54 |
| 4,257,784 | 3/1981 | Gerhard et al. | 261/DIG. 54 |
| 4,279,196 | 7/1981 | Bloomer | 55/DIG. 46 |

FOREIGN PATENT DOCUMENTS 47710 10/1977 U.S.S.R. .................. 261/DIG. 54

Primary Examiner—David L. Lacey
Attorney, Agent, or Firm—Dann, Dorfman, Herrell and Skillman

[57] ABSTRACT

A paint-spray chamber having a grate-like floor with an outlet for particle-laden air below said floor, said outlet comprising water reservoirs along the periphery of the spray chamber and a venturi outlet disposed centrally of said chamber between the water reservoirs. Water is continuously supplied to said reservoirs to fill the reservoirs to overflowing and cause the water to flow into said venturi so as to provide a body of water underlying the floor. The venturi is formed by opposed venturi sides converging toward the central axis of the venturi outlet in the direction of the gas flow to a venturi throat. A pair or a series of pairs of guide plates extend inwardly from said opposite venturi sides adjacent said reservoir means and converge toward one another in the direction of air flow with a greater angle of convergence than said venturi sides and terminate in one or more noise-muffling zones along said venturi axis above said throat. Water flows from said reservoirs over said guide plates, along said plates and into said noise-muffling zones to cause the air and water flows to blend and mix together in said zones. A separation chamber is below said reservoirs to receive the particle-laden air and water. The particle-laden air and water is discharged to impinge against a film of water in said separation chamber or into a reservoir of water in said separation chamber opposite the venturi outlet.

22 Claims, 11 Drawing Figures

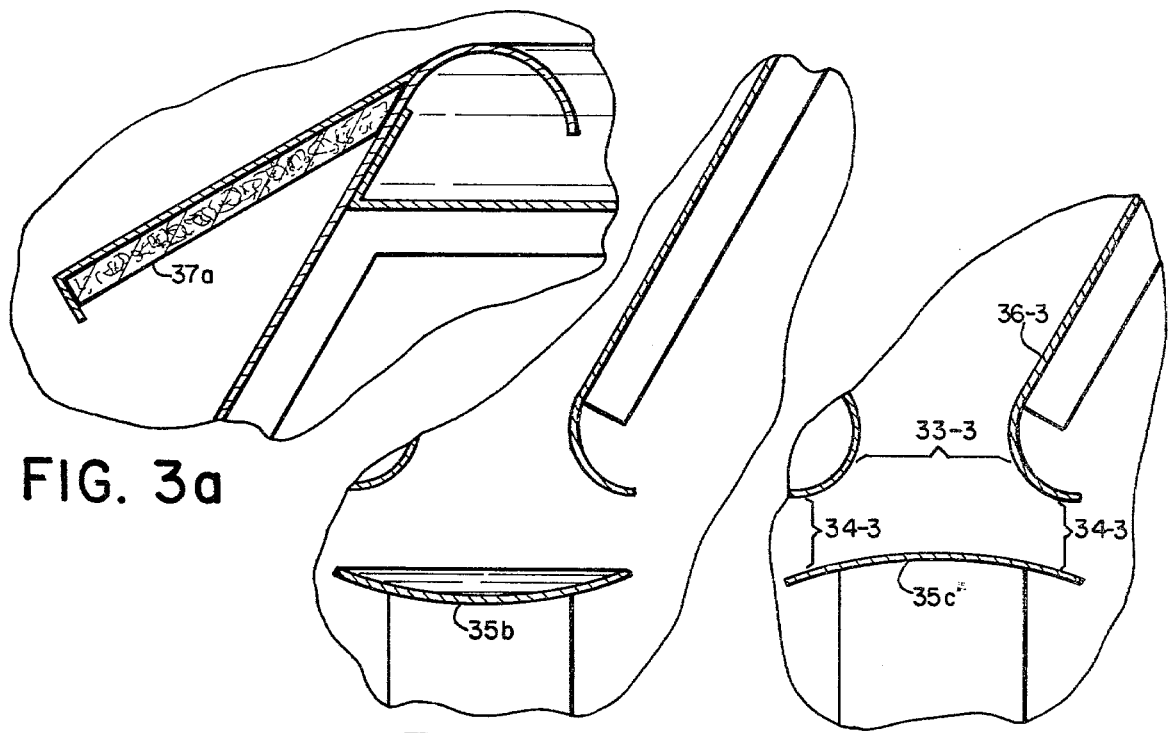
FIG. 3a
FIG. 3b
FIG. 3c
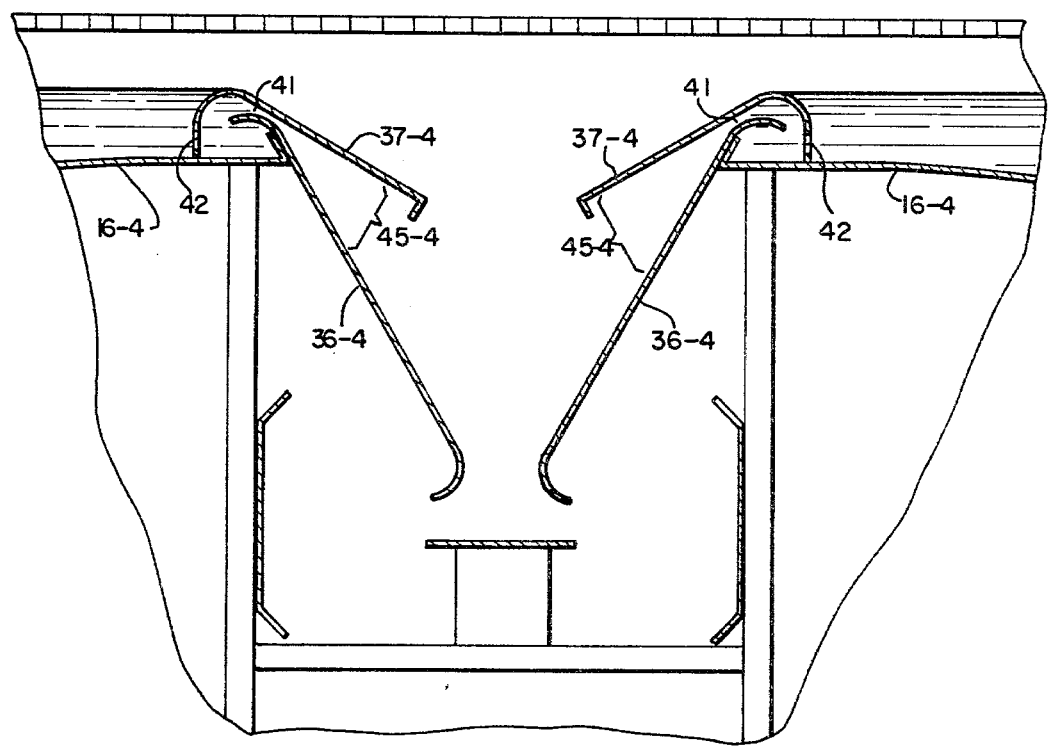
FIG. 4

SPRAY CHAMBER INCLUDING A WET SEPARATOR

FIELD OF THE INVENTION

The present invention relates to a wet separator, and in particular, to a separator which is used as an outlet from a spray chamber, for example, a spray chamber for painting automobile chassis or bodies.

BACKGROUND OF THE INVENTION

It has been previously known to utilize one or several venturis as an outlet from spray chambers, for instance, for spray painting automobile chassis or bodies. The venturis may be suitably disposed directly below or even at some distance from the floor of the spray chamber, which is grate-like so that conditioned air may be exhausted through it to carry away paint particles from the spray chamber. In passing through the venturis, the air speed is considerably increased causing a special effect wherein the particles of paint agglomerate and can more easily be taken care of in a subsequent separation procedure. Water is also circulated under the grate-like floor and through the venturi so that it is not stopped up by paint. The flowing water is conveyed through a collection chamber, for example to a reservoir beneath the grate-like floor and means have been provided for recirculating (either partially or completely) both the conditioned air exhausted from the spray chamber and the water.

DESCRIPTION OF THE PRIOR ART

Although the prior art venturi arrangements function satisfactorily to effect cleaning of the paint particles from the air, the production of noise in such venturis can be very troublesome and prior devices for muffling noise have reduced the efficiency of the apparatus so that noise and efficiency oppose one another. In particular a unit with a greater noise-muffling effect as rule is difficult to clean, while a unit which is easily cleaned as a rule has a very high production of noise, which, in these times, is completely unacceptable. Even in units having a lower production of noise, and even with impaired cleaning possibilities, the noise is so high that it is troublesome for personnel who have to spend time in the spray chamber or the like.

SUMMARY OF THE INVENTION

A principal object of the present invention is therefore to provide a wet separator which on one hand reduces the production of noise, and which despite this and without sacrificing separation efficiency, is easy to keep clean or to clean.

More specifically, the present invention provides a separator of the stated type which is characterized by guide plates in the venturi to reduce the noise level. Laboratory tests have shown that under otherwise identical operating conditions, a conventionally-designed wet separator has a noise level of about 82 db(A), while a wet separator according to the present invention reduces this level to about 76 db(A), which must be regarded as a substantial improvement, since only a marginal reduction in db(A) signifies an enormous relief for the personnel in the spray chamber.

BRIEF DESCRIPTION OF THE DRAWINGS

Further features and advantages of the invention are set forth in the following description with reference to the accompanying drawings which illustrate some non-limiting embodiments of the invention:

FIGS. 3a, 3b and 3c are enlarged fragmentary illustrations showing modifications of the venturi outlet shown in FIG. 3;

FIGS. 4 and 5 are views similar to FIG. 3 illustrating further embodiments of a venturi outlet embodying the present invention;

DESCRIPTION OF THE PREFERRED EMBODIMENTS

Figure 1:
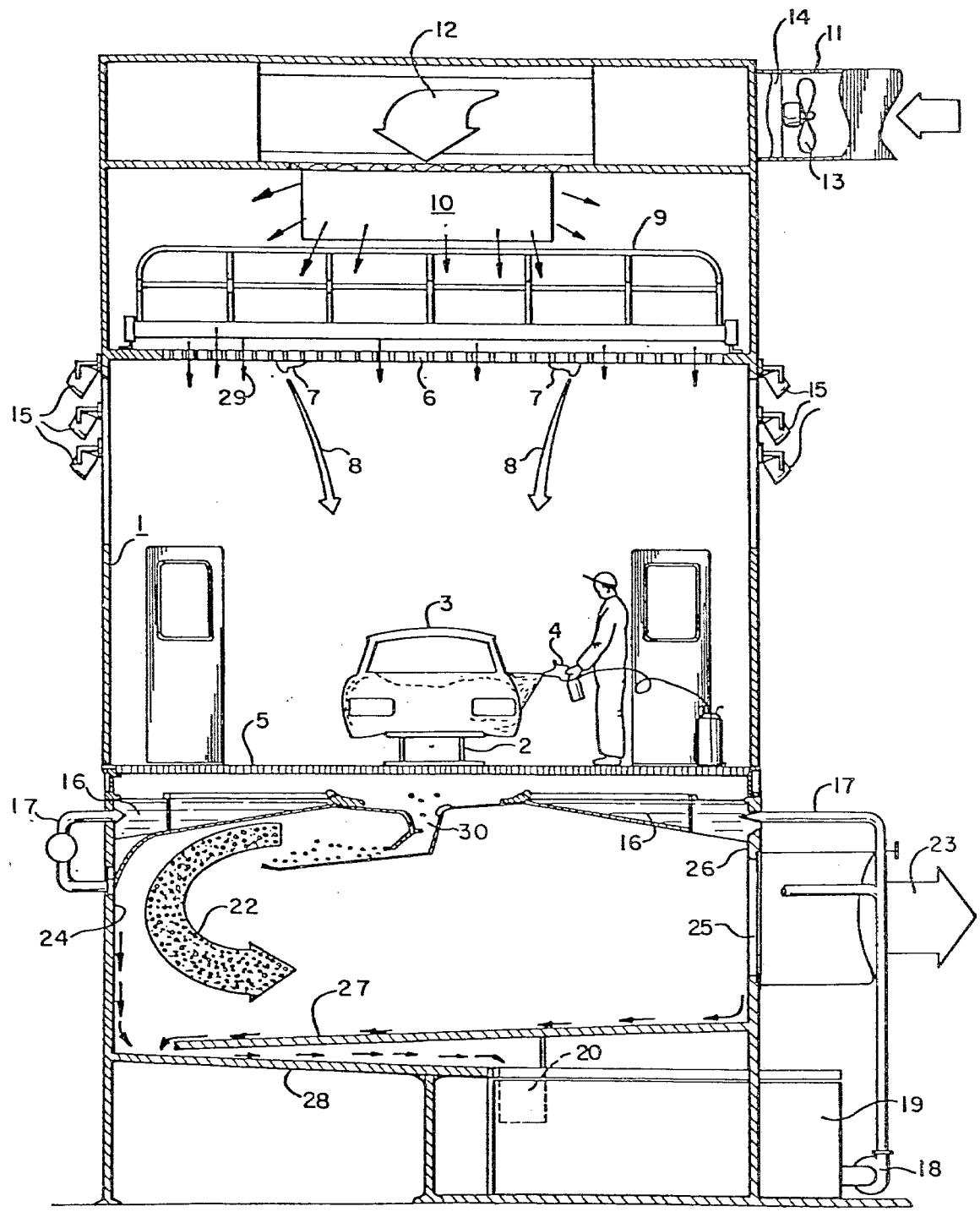
FIG. 1 shows in cross section a conventional spray chamber for spray painting of automobile chassis or bodies.

FIG. 1 illustrates a prior art spray chamber for spray painting automobile chassis and is somewhat similar to the spray painting chamber shown in U.S. Pat. No. 3,795,093 which issued Mar. 5, 1974. The figure illustrates a closed spray painting chamber 1 through which an object 3 to be spray painted is advanced for example by a conveyor 2. The object 3, in the present instance an automobile body or chassis, is spray painted by means of spray equipment 4 manipulated by personnel who are supported in the chamber 1 by a walkway 5 in the form of a grate-like floor.

An inspection bridge 9 is disposed above the conveyor 2 in the space above an inner ceiling 6 of the chamber 1, and a preferred lighting arrangement for the work area is provided by lamps 15 positioned behind suitable translucent window in the side walls of the chamber 1. The inner ceiling 6 of the chamber 1 is preferably perforated and is provided with air nozzles 7 for producing two curtains of air 8 which flow downwardly on opposite sides of the chassis 3 at substantially greater velocity than the partial currents of air 29 which pass through the perforations in the ceiling 6 from an air distributor 10 above the inner ceiling. The nozzles 7 are designed to afford modification of the air curtains along the length of the conveyor 2 so as to enhance the spray painting operation and the after-treatment of the chassis leaving the spray-painting area.

The air distributor 10 above the ceiling 6 is fed by an inlet duct 11 having a fan 13 which generates a flow of air as indicated by the arrow 12. Suitable heat exchanger means may be provided at 14 to control the temperature of the air introduced through the distributor 10. As indicated, the distributor 10 may include suitable filtration means to avoid contamination of the spray chamber 1.

The air curtains 8 and the partial air flows 29 issuing from the perforated ceiling 6 cause a generally downward flow of air through the spray chamber, carrying with it the atomized paint from the spray equipment 4 which is not adhered to the chassis 3. The downward flow of air is discharged through the grate-like floor or walkway 5. Below the floor 5 there are one or more water reservoirs 16 which are located along the sides of the spray chamber beneath the floor 5 and extend inwardly under the major portion of the floor 5. As an alternative as shown in the aforesaid U.S. patent, inwardly declining walls may be provided under the floor which slope towards the center and are continually flushed with water. The water is supplied to the reservoir 16 (or to the sloping walls) by supply pipes 17 leading from a pump 18 connected to a sump or reservoir 19 having a drain trap 20. A suitable chemical may be added to the water in the reservoir 19 to destroy or emulsify the paint or otherwise modify the paint so that its glue-like properties are reduced or eliminated.

The reservoirs 16 are spaced above the collection tank 19 so as to provide a separation space for separating the paint particles from the flow of air (indicated at 22) which is discharged through a venturi 30 positioned between the reservoirs 16. As shown, the venturi 30 has a configuration which deflects the air current 22 against a rebound wall 24 prior to discharging from the separation space through an outlet opening 25 in the opposite wall 26 as indicated at 23. The air flowing downwardly through the grate-like floor 5 of the spray chamber 1 picks up moisture from the reservoirs 16 to effect agglomeration of the paint particles as they are accelerated through the venturi 30 and into the separation chamber. The agglomerated particles are separated from the flow 22 as it is reversed by the wall 24 and the air is caused to discharge through the opening 25 at a substantially reduced velocity in comparison with the velocity through the venturi 30. The rebound wall 24 is flushed with water as indicated by the arrows to reduce the amount of paint which adheres to the wall. Likewise the opposite wall 26 may be flushed with water and the bottom 27 of the separation space slopes toward the rebound wall 24 so that the water flowing from the wall 26 carries with it the paint particles which precipitate out of the reduced-velocity flow toward the opening 25. The water flushing the wall 24 and the bottom 27 is discharged by a sloping bottom wall 28 which feeds into the trap 20 of the reservoir 19.

Figure 2:
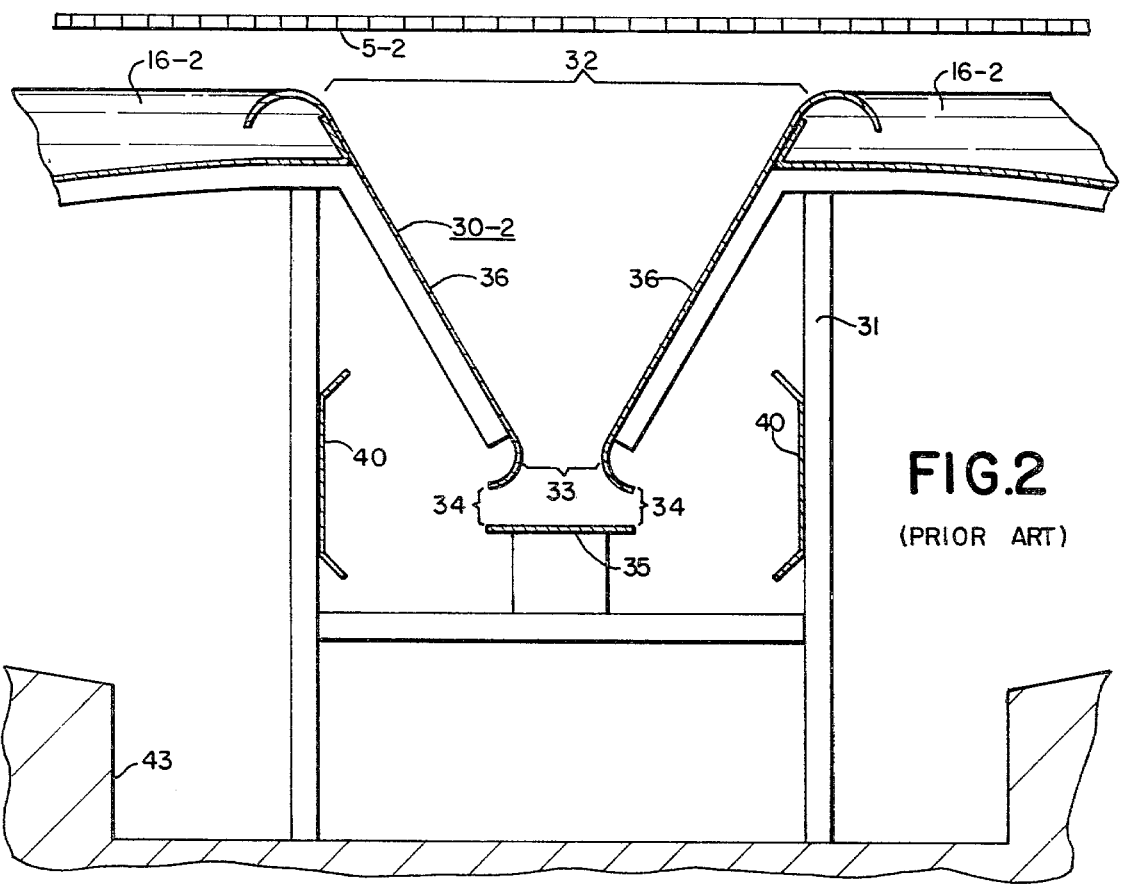
FIG. 2 illustrates a prior art venturi arrangement for enhancing the agglomeration of the paint particles in spray chambers of the type shown in FIG. 1.

The assymmetrical construction of the venturi 30 is not used universally. A symmetrical prior art arrangement is shown in FIG. 2 wherein the walkway 5-2 of the spray chamber overlies a central venturi 30-2 which is symmetrical about the longitudinal center line of the spray chamber and is designed to be flushed by water issuing from reservoirs 16-2 on opposite sides of the chamber beneath the walkway 5-2. In this configuration, the venturi 30-2 is supported by a framework 31 so that the downwardly converging walls 36 provide a funnel-like effect between the inlet 32 at the upper end, and the venturi throat 33 at the lower end. A rebound plate 35 is positioned below the venturi throat 33 to deflect the flow through the venturi outwardly through outlets 34 formed between the plate 35 and the rounded ends of the sloping walls 36. The outlets 34 from the venturi throat 33 form supplemental venturi outlets directed in opposite direction against splash plates 40 which may function corresponding to the rebound wall 24 of the separation chamber shown in FIG. 1. It is noted that the upper ends of the sloping wall 36 are rounded outwardly into the reservoirs 16-2 so as to facilitate a uniform flushing of the sloping sides 36 with water from the reservoirs. The water flowing through the venturi 33 and carried through the venturi outlets 34 will precipitate paint particles from the air flow through the venturi and the contaminated water may be collected in the collection channel 43 underlying the venturi. An arrangement similar to that shown in FIG. 1 may be provided for recirculating the water and the air.

With a suitable flow of water, a venturi of the type shown in FIG. 2 functions relatively well with regard to its capability to separate paint particles from the air flow without a substantial accumulation of paint deposits on the walls. However, the impact plate 35 tends to build up with paint particles and must be cleaned regularly. The open framework 31 and the large angle of convergence of the sides 36, in the present instance 60°, facilitates cleaning but causes a high and barely acceptable noise level during operation. In laboratory tests, a noise level of 82.5 db(A) has been produced. The noise level is reduced by reducing the angle of convergence of the walls 36 but any reduction in the angle limits the accessability to the walls and the impact plate for cleaning. The continual operation of spray painting does not permit interruption of the operation and dismantling of the parts for cleaning, and accordingly accessability for cleaning without dismantling is particularly significant. It has been proposed to provide damper plates to eliminate direct flow of paint-laden air through the outlet but installation of such a damper plate has not been practical because of the need for frequent removal of the damper plate because of paint build-up on it.

Figure 3:
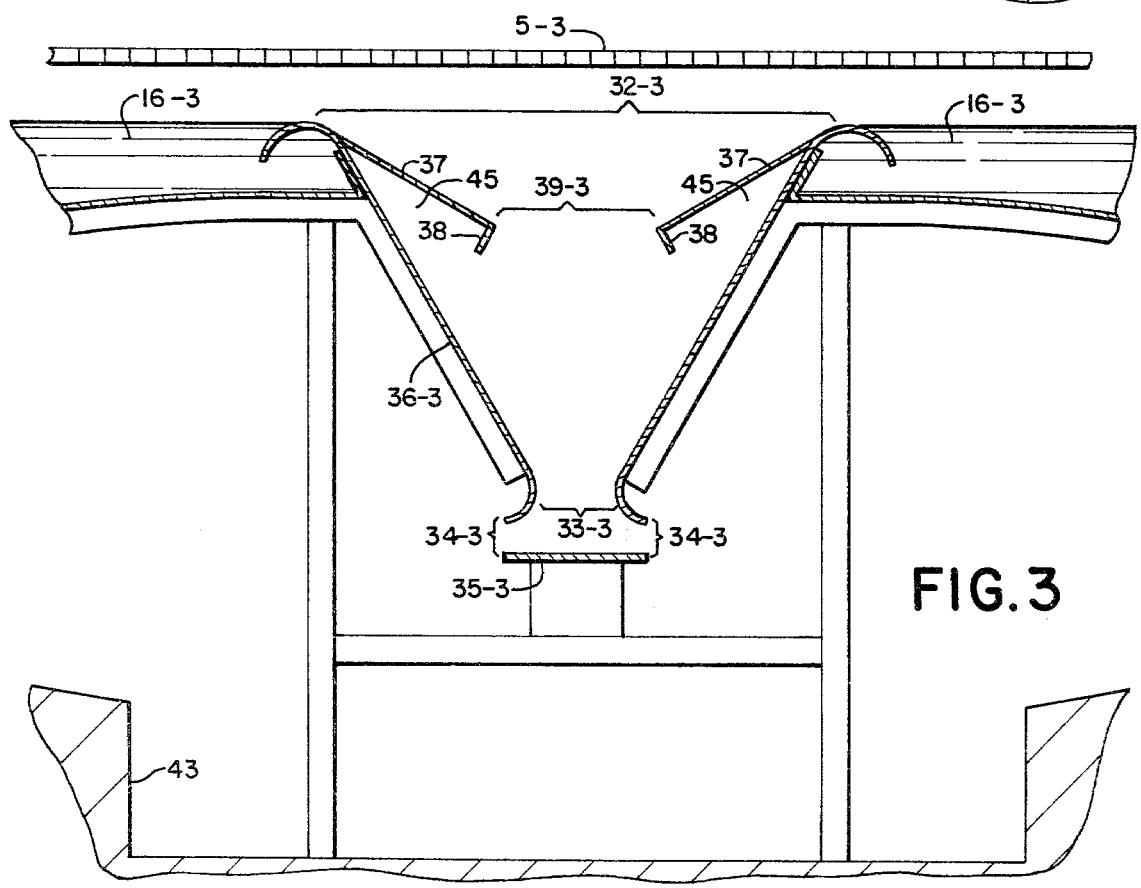
FIG. 3 is a view similar to FIG. 2 illustrating schematically a first embodiment of a venturi outlet embodying the present invention.

With the foregoing in mind, and in accordance with the present invention, the venturi configuration of FIG. 2 has been modified as shown in FIG. 3. In this figure the floor has been designated 5-3, the reservoirs 16-3, the venturi inlet 32-3, the converging walls 36-3, etc. As shown in FIG. 3 the inlet 32-3 of the venturi is in a horizontal plane perpendicular to the axis of the venturi, and is provided with guide plates 37 which extend inwardly toward the center axis of the venturi from the sloping walls 36-3 adjacent the venturi inlet 32-3. The guide plates 37 converge at a larger angle of convergence than the walls 36-3. The walls 36-3 converge at an angle of approximately 60° whereas the plates 37 converge at an angle in the range between 90° and 170°, preferably between 110° and 130°. As the walls and plates are symmetrical to the center axis of the venturi, their angle to the inlet plane is in the range between 5° and 45°, preferably between 25° and 35°. The inner ends of the converging guide plates 37 form a passageway 39-3 for the paint-laden air with a flow area preferably 1.5 to 2.0 times as large as the total flow area through the venturi outlets 34-3. In the event the impact plate 35-3 is omitted or eliminated, the flow area 39-3 should be 1.5 to 2.0 times as large as the flow area of the venturi throat 33-3.

The installation of the guide plates 37 substantially reduces the noise generated by the air flow through the venturi without substantially adversely affecting the functional operation of the venturi. To provide greater structural rigidity to the plates 37, the interior edges of the plates are turned downwardly as indicated at 38 to provide flanges at an angle to the converging walls of the plates 37. The flange angle may range between 30° and 150°, but preferably is 90° so as to maximize the rigidity of the plates 37 and minimize vibration. The flanges 38 cooperate with the walls 36-3 and the undersides of the plates 37 to form noise pockets which provide a further effect as discussed below.

The widely-converging plates 37 at the inlet 32-3 deflect the paint-laden air and entrained water inwardly toward the center axis of the venturi. Because of the relatively flat angle relative to the horizontal, the downward flow generates currents along the surfaces of the plates 37 which are directed toward one another and the water currents and the paint-laden air flow meet within or just below the opening 39-3 between the guide plates 37. The opening 39-3 thereby forms an acoustical lock which blocks the noise from the venturi 33-3 and the venturi outlets 34-3 from traveling upwardly into the chamber of the spray painting booth where the personnel are located.

Particularly if the flow of water over the plates 37 is intensive, a substantial reduction of noise transmission is achieved. If the water flow down the plates 37 is sufficiently great, a noise trap may be provided by the water discharged from the inner edges of the plates, particularly if the water currents impinge against one another centrally of the opening 39-3. A considerably reduced portion of the noise is allowed to penetrate through the noise trap or acoustical lock formed at the opening 39-3 and a clearly discernable muffling of the noise level within the work area above the floor 5-3 is achieved.

If the free edges of the plates 37 are designed to deflect the noise into the noise pockets 45 formed in the space below the guide plates 37-3 and above the walls 36-3, the deflected noise may reverberate and produce counter-vibrations which dampen the transmission of noise through the opening 39-3. In this connection, the flanges 38 may cooperate with the noise-pockets to enhance the dampening effect.

To further dampen the transmission of noise through the opening 39-3, the underside of the guide plates 37 may be provided with acoustical insulating material 37a as shown in FIG. 3a, to increase the noise-deadening effect of the noise pockets 45.

The configuration of the venturi of FIG. 3 enhances the cleanability of the structure since the guide plates 37 protect the venturi throat 33-3 from direct impingement of paint-laden air which has not been subjected to water conditioning. The accumulation of paint in the area of the throat 33-3 may be reduced by substitution of a concave rebound plate 35b as shown in FIG. 3b. The dish-like shape of the plate 35b accumulates a body of water which inhibits the accumulation of paint particles on the plate. Particularly if the water includes an emulsifier or other treating agent, it will carry away the paint particles which would otherwise collect on the plate. Alternatively the plate may be convex as indicated at 35c in FIG. 3c to provide a streamlined flow path from the venturi throat 33-3 to the venturi outlets 34-3, reducing the turbulence which may cause the paint to precipitate out on the parts of the wall 36-3 and plate 35c in the outlet area. In any event the configuration of FIG. 3 may be regarded as a substantial advance in providing a venturi outlet for spray chambers with a low production of noise and in which the cleaning capability is acceptable.

Under certain harsh operating conditions, for example when there is non-uniform flushing or a substantial pressure drop through the venturi, or when the composition of the paint makes it difficult to destroy or emulsify, or other difficulties arise, it may be desirable to insure an intensive flushing of the venturi sides throughout their length under the guide plates. A configuration of venturis shown in FIG. 4 wherein the guide plates 37-4 are spaced from the upper end of the converging side walls 36-4 of the venturi and are anchored in the reservoir structure 16-4 as shown in FIG. 4. The spacing between the guide plates 37-4 and venturi sides 36-4 provides openings 41 forming a brim drain or weir which permits discharge of water from the reservoirs 16-4 along the inwardly directed surfaces of the venturi walls 36-4. Flow passageways 42 are provided in the support structure for the guide plates 37-4 to permit the water to flow into the space between the plate 37-4 and the side walls 36-4. By extending the plates 37 into the bottom of the reservoir and affording flow through the openings 42, the openings 42 may function to limit agglomerated paint particles from flowing into the clearance space 41 where they might clog the flushing operation provided by these clearance slots. The lumps of paint which cannot flow through the restricted openings 42 may flow over the top of the plates 37-4 and onto their upper surface, where they may be readily removed during the cleaning operation. With the structure of FIG. 4 the entire upper surfaces of the venturi sides 36-4 are flushed, even within the noise pockets 45-4 between the under side of the plates 37-4 and the upper sides of the venturi walls 36-4 which provide the noise trap discussed above. The flow of water on the wall 36-4 within the noise pocket 45-4 further dampens the noise and renders the noise trap more effective in muffling noise and vibration by covering the metal surface of the wall 36-4.

Figure 5:
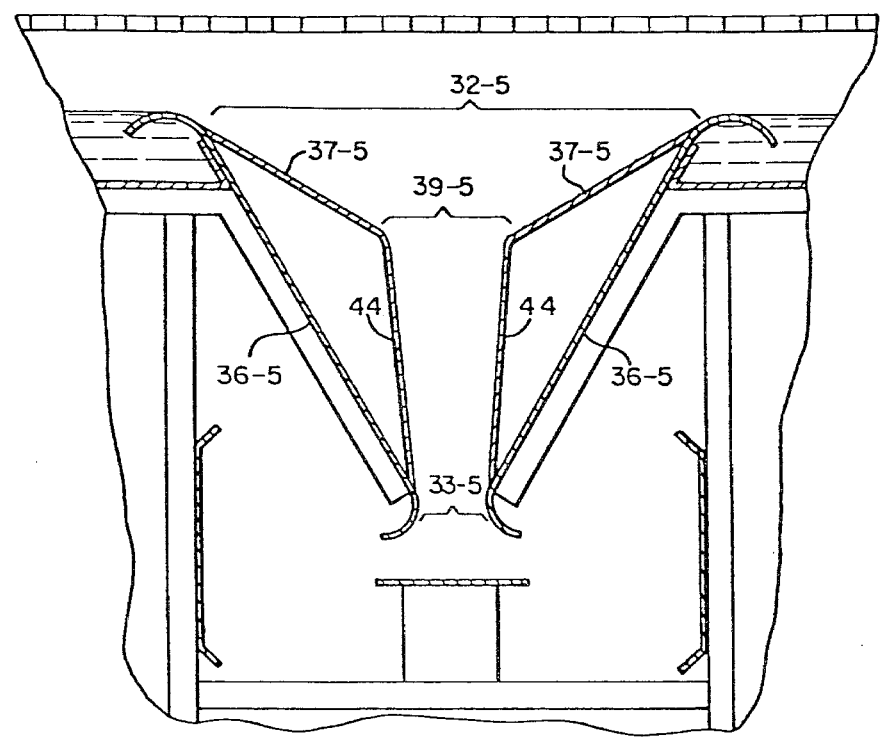

A further embodiment of the invention is shown in FIG. 5 wherein the venturi sides 36-5 are almost completely covered by the extension elements 44 of the guide plates 37-5. The extensions 44 replace the flanges 38 of the previously-described embodiments. Since the plates 37-5 and the extensions 44 are imperforate, the walls 36-5 below them may be omitted of desired. In the illustrated embodiment, the plates 37-5 converge from the venturi inlet 32-5 to a reduced opening 39-5 with a large angle of convergence. The extensions 44, on the other hand, converge very gradually toward the throat 33-5 so that the extension plates 44 are very steep and have a small angle of convergence ranging from between 1° and 5° in the direction of the throat 33-5. Instead of a single break between the elements 37-5 and the extensions 44, the angle may be taken in steps or even made in a continuous curve. The angular configuration is preferred to enhance the flow of flushing currents into the center of the opening 39-5 to provide an acoustical lock within or just below the opening 39-5 as discussed above.

Figure 6:
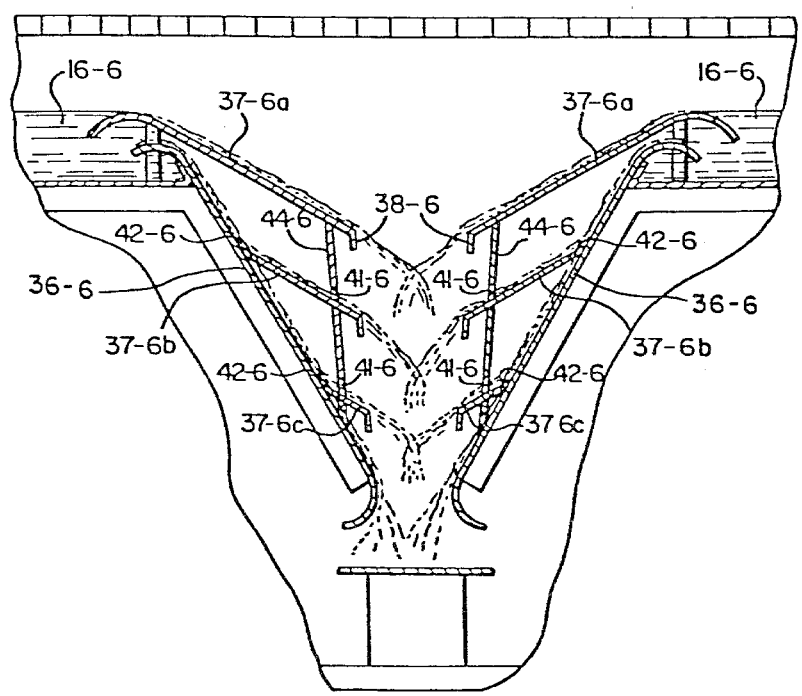
FIG. 6 is a fragmentary view through a modified venturi outlet similar to the outlet shown in FIG. 4.

A more complex arrangement is shown in FIG. 6 wherein the venturi sides are provided with multiple guide plates 37-6a, 37-6b and 37-6c. The interior ends of the guide plates may be supported by extensions 44-6 which are spaced outwardly from the terminal flanges 38-6 of the respective guide plates. The space between the extensions 44-6 and the flanges 38-6 provide multiple noise pockets which will dampen the noise transmission through the venturi. Further acoustical locks are provided by causing the water from the reservoirs 16-6 to flow downwardly over the respective plates 37-6a through 37-6c by the use of suitable passageways or flow openings 42-6 along the walls 36-6 and passages or flow openings 41-6 at the junctions between the extensions 44-6 and the respective plates 37-6b and 37-6c. By providing the flow openings 41-6 and 42-6, the water flowing from the reservoirs 16-6 may intersect within the venturi to provide further acoustical traps. The illustrated embodiment in FIG. 6 shows a gradual diminishing of the spacing between the flanges 38-6 as the plates 37-6a, b and c approach the throat of the venturi. For particular problems where special sound or vibration frequencies are present, the spacing between the flanges 38-6 and the angle of the plates 37-6 may be altered to take care of and eliminate the special problem frequencies. In a similar manner the configuration of the venturi throat in any of the foregoing embodiments may be modified to achieve a reduction in noise level.

In each of the foregoing structures, it is appropriate to make the venturi structure removable from the surrounding supply reservoirs and the supporting framework. In such case cleaning of the venturi may be accomplished off-site, and during the cleaning operation a replacement venturi structure may be substituted. Furthermore the configuration of the substitute venturi structure may be different to accommodate different operating conditions.

Figure 7:
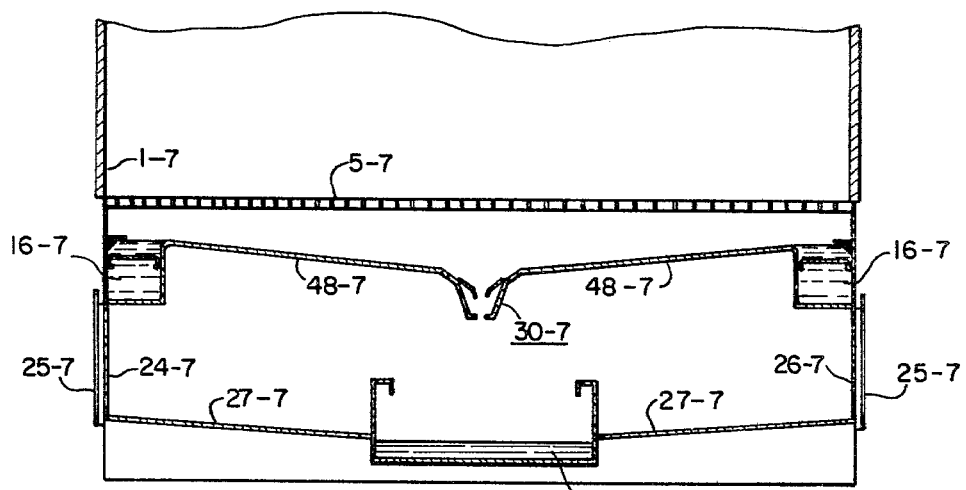
FIG. 7 is a fragmentary cross sectional view through the bottom of a spray painting chamber embodying a venturi outlet having a still further difference in configuration from the configurations shown in the earlier figures.
Figure 8:
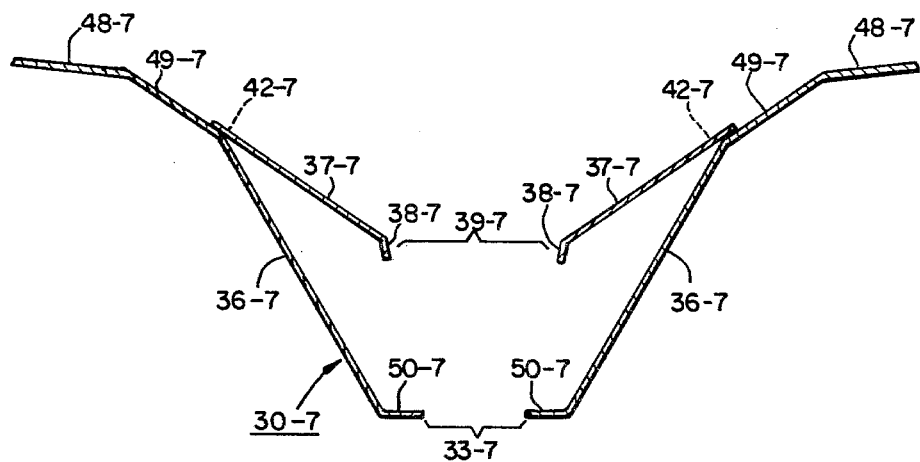
FIG. 8 is an enlarged sectional view showing the venturi outlet of FIG. 7.

FIGS. 7 and 8 illustrate a modified embodiment of the invention wherein the venturi throat is formed by inturned flanges at the bottom of the converging venturi walls rather than the outwardly curved bottom portions shown in the previous embodiments.

In the embodiment illustrated in FIGS. 7 and 8, the bottom of the spray chamber is shown diagrammatically as indicated at 1-7. The grate-like floor 5-7 is illustrated in FIG. 7 without showing the other details which are illustrated in FIG. 1. The spray chamber of FIG. 7 may be identical to that of FIG. 1 or it may embody other modifications which do not affect the operation of the venturi outlet beneath the grate-like floor 5-7. Below the floor 5-7 there is an exhaust chamber formed between walls 24-7 and 26-7 which have exhaust outlets 25-7 along the length thereof. The bottom 27-7 of the exhaust chamber slopes inwardly towards a reservoir 19-7 running along the length of the exhaust chamber centrally thereof. Along the upper part of the walls 24-7 and 26-7 reservoirs 16-7 are positioned below the floor 5-7. Supply means (not shown) supplies a flow of water to the reservoirs 16-7 so that the water overflows the reservoir and runs as a sheet along the intermediate walls 48-7 which slope inwardly toward the central venturi 30-7 extending along the length of the exhaust chamber.

As shown more clearly in FIG. 8, the inwardly sloping walls 48-7 terminate adjacent the center line in transition walls 49-7 which are inclined steeper and merge into venturi walls 36-7 which terminate at their lower end in inwardly turned flanges 50-7 forming between them a venturi throat 33-7 which also constitutes the outlet opening of the venturi. To provide acoustical damping, guide plates 37-7 are positioned as a continuation of the transition walls 49-7 to overlie the venturi walls 36-7 and form acoustical traps therebetween. in the present embodiment, the guide plates 37-7 terminate in downturned flange portions 38-7 which define between them an inlet opening 39-7 which is between 1.5 and 2.0 times the width of the venturi outlet 33-7. The water flowing down the intermediate walls 48-7 in the venturi 30-7 forms a film which may flow into the opening 39-7 and meet with the flow from the opposite parts to form a further acoustical trap.

A portion of the water flowing down the transition walls 49-7 is directed through openings 42-7 in the guide plates 37-7 onto the venturi walls 36-7 where it may flow downwardly and inwardly over the flange portions 50-7 into the venturi throat 33-7. The inwardly-directed flanges 50-7 are effective to inject the water flowing down the sides 36-7 into the throat 33-7 is aspirated into the flow of air through the throat to thoroughly intermix with the air.

The venturi throat 33-7 is positioned directly above the reservoir 19-7 so that the downward flow of paint-laden air flowing through the venturi may impinge against the body of water in the reservoir 19-7 prior to deflecting upwardly out of the reservoir into the exhaust chamber from which it is discharged through the openings 25-7. The structure of the embodiment of FIGS. 7 and 8 may be modified as discussed above to provide acoustical lining material on the under surfaces of the plates 37-7 and to provide multiple traps as required. The configuration of the venturi throat 33-7 in FIGS. 7 and 8 enhances the injection of moisture into the flow of air passing through the venturi so as to assist in the agglomeration of paint particles and the like in the air passing downwardly through the venturi.

In all of the foregoing embodiments, the structure has been described in connection with a spray chamber having a longitudinal conveyor running throughout its length. The venturi in each instance also extends along the length of the spray chamber centrally below the conveyor. Within the scope of the present invention, it is possible to utilize the invention in a spray chamber or booth in which the materials are introduced manually and removed manually. In such a chamber, the exhaust chamber below the floor may be in the form of a hollow cylinder or cubical and the venturi may be a generally frusto-conical passageway located centrally of the exhaust chamber, with the venturi walls being frusto-conical with a relatively sharp apex angle and the guide plates being frusto-conical with a shallower or wider apex angle. The acoustical traps provided by the noise pockets between the guide plates and the venturi walls is at least as effective as the traps described above and the traps provided by the intersecting currents from the walls is likewise at least as effective as the traps described above.

The venturi of the present invention not only minimizes the transfer of sound into the spray chamber overlying the venturi, but also provides a highly efficient heat recovering system for the spray chamber. Particularly where the exhausted air is not fully recirculated, it is desirable to recover as much heat as possible from the exhausted air prior to its being discharged into the atmosphere. The intimate contact of the flushing liquid with the air passing through the venturi achieved by the present invention provides a more efficient heat recovery because of the better heat storage and transfer capability of flushing water as a heat-receiving medium. The flushing water may be passed through a suitable heat pump or other heat exchanger to extract the heat for use in the drying of the products which are painted in the spray paint chamber or for other uses as desired. It should be noted that the prior art venturis as shown in FIGS. 1 and 2 do not provide the prolonged contact time between the air and the water-covered venturi walls in the venturi inlet and outlet which the present invention provides. When using the present invention a prolonged contact between the airflow and the water-covered walls is achieved providing for greater heat transfer from the air to the water.

The foregoing embodiments have been described with particular reference to venturi outlets for spray chambers, but the invention is not limited to this particular application, but is applicable to other wet separators, including separators where even solid, powder, or granular materials or even viscous materials are to be separated from a flowing gaseous medium. Similarly, the venturi arrangement of the present invention may be used alone as described in the previous embodiments or may be used in series or in parallel arrangement with other venturi arrangement depending upon the requirements for the particular end use.

Thus while particular embodiments of the present invention have been herein illustrated and described it is not intended to limit the invention to such disclosure but changes and modifications may be made therein and thereto within the scope of the following claims.

We claim:

1. A wet separator comprising at least one exhaust venturi with an inlet for a flow of gaseous medium, a venturi throat and outlet means, said venturi throat being formed by opposed venturi sides converging toward the central axis of the at least one exhaust venturi in the direction of the gas flow from said inlet to said outlet, and means to cause liquid to flow into said at least one exhaust venturi along said sides, first guide plates extending inwardly from said opposed venturi sides adjacent said inlet and converging toward one another in said direction of flow and terminating in a noise-muffling zone defined between the plates and the venturi sides in advance of said venturi throat, said plates directing both said gas and said liquid flows into said zone to blend said flows in the noise-muffling zone.

2. A wet separator according to claim 1 wherein said venturi inlet is disposed in a plane substantially perpendicular to the central axis of the at least one venturi, and said guide plates converge with a flatter angle relative to said inlet plane than the venturi sides, said angle of the plates being in the range between 5° and 45° relative to said inlet plane.

3. A wet separator according to claim 2 wherein said angle of the plates relative to said inlet plane is between 25° and 35°, and the angle of said venturi sides relative to said inlet plane is approximately 60°.

4. A wet separator according to claim 1, wherein the free terminal ends of the guide plates located nearest to the central axis of the at least one exhaust venturi, define an opening, whose flow area is 1.5 to 2 times as large as the flow area through the venturi outlet means.

5. A wet separator according to claim 1, wherein the ends of the guide plates located nearest to the central axis of the at least one exhaust venturi have end flanges directed towards the venturi sides, each flange being at an angle between 30° and 150° relative to its associated guide plate to form a noise trap between the flange, the guide plate and the venturi side.

6. A wet separator according to claim 1 wherein said venturi sides terminate with confronting flange means defining therebetween the said venturi throat.

7. A wet separator according to claim 6 wherein said throat is coincident with said outlet means.

8. A wet separator according to claim 7 wherein said venturi axis is vertical with said inlet at the top, and including a reservoir underlying said at least one exhaust venturi to be impinged by the flow of gaseous medium issuing from said venturi outlet.

9. A wet separator according to claim 1, including a rebound plate disposed transverse to the venturi axis beyond the venturi throat, the downstream terminal edges of the venturi sides cooperating with said plate to form between them, said venturi outlet means.

10. A wet separator according to claim 9 wherein said plate is upwardly concave to form a receptacle for accumulating liquid from said outlet means.

11. A wet separator according to claim 9 wherein said plate is upwardly convex to deflect the flow from said outlet means laterally outward.

12. A wet separator according to claim 1, wherein said guide plates are positioned and arranged adjacent the inlet ends of the venturi sides form at least one flushing opening to cause a portion of said liquid to flow along the venturi sides downstream of said guide plates.

13. A wet separator according to claim 1 wherein said venturi inlet is disposed in a plane substantially perpendicular to the venturi axis, and including extension plates extending from adjacent the inner ends of the guide plates to a point adjacent the venturi throat, the extension plates being steep relative to the plane of the venturi inlet and with a small angle of convergence in the direction toward the throat.

14. A wet separator according to claim 13, wherein the guide plates extend beyond said extension plates and have flanges extending toward the venturi sides to form noise traps between the flanges and the extension plates.

15. A wet separator according to claim 1 or claim 14 including a number of additional guide plates arranged in series with said first guide plates to form a gill-like structure with a series of noise traps defined between the venturi sides and the respective first and additional guide plates.

16. A wet separator according to claim 1, wherein said venturi axis is substantially vertical with said inlet at the top, and said means to cause liquid to flow into said at least one exhaust venturi comprises reservoir means adjacent the venturi inlet and having supply means for said liquid, said guide plates having upper parts overlying the upper ends of the venturi sides and extending downwardly into said reservoir means, said liquid supply means causing the liquid to flow over said upper parts and down along the upwardly-facing surfaces of converging guide plates.

17. A wet separator according to claim 16, wherein said guide plates are spaced above the upper ends of the venturi sides so that the space below the guide plates provides an opening for liquid to flow over the upper ends of the venturi sides and below the guide plates to wet the surfaces of the venturi sides.

18. A wet separator according to claim 16 including means mounting at least the guide plates and the venturi sides adjacent said reservoir means for removal and replacement.

19. In a spray chamber having a grate-like floor, said grate-like floor having openings therethrough for the passage of particle-laden air downwardly therethrough, and an outlet for particle-laden air below said floor, said outlet comprising water reservoirs disposed below said floor along the periphery of the spray chamber and an exhaust venturi disposed centrally of said chamber below the floor between the water reservoirs and arranged to afford flow of said air in one direction therethrough, means to continuously supply water to said reservoirs to fill the reservoirs to overflowing and cause the water to flow into said exhaust venturi so as to provide a body of water underlying the openings in said grate-like floor, said exhaust venturi being formed by opposed venturi sides extending downwardly from said reservoir means and converging toward the central axis of the exhaust venturi in the direction of the air flow to define therebetween a venturi throat spaced below the reservoir means, the water from said reservoir means flowing along said venturi sides into said throat, and guide plates extending inwardly from said opposite venturi sides adjacent said reservoir means and converging toward one another in the direction of air flow with a greater angle of convergence than said venturi sides and terminating in a noise-muffling zone along said venturi axis above said throat, and means to cause water from said reservoir means to flow over said guide plates, along said plates and into said noise-muffling zone to cause the air and water flows to blend and mix together in said zone.

20. A spray chamber according to claim 19, including a separation chamber positioned below said reservoirs and said exhaust venturi, said exhaust venturi arranged to discharge the mix of particle-laden air and water into said separation chamber, said separation chamber including a wall means opposite the outlet of said exhaust venturi toward which said mix is directed.

21. A spray chamber according to claim 20, including means to cause a film of water to flow over said wall means so that the mix of particle-laden air and water is discharged to impinge against said film of water in said separation chamber.

22. A spray chamber according to claim 20, including a reservoir of water overlying said wall means in said separation chamber opposite the outlet of said exhaust venturi and positioned so that the mix of particle-laden air and water issuing from said outlet impinges against the surface of the water in said reservoir.

* * * * *